United States Patent
Jeon

(10) Patent No.: US 6,944,576 B2
(45) Date of Patent: Sep. 13, 2005

(54) FACTORY AUTOMATION CONTROL METHOD

(76) Inventor: Yeong-Min Jeon, 118-1005 Keuntho-donga apartment Cheonglyang-Dong, Yoonsu-gu Incheon, 406-775 (KR)

( * ) Notice: Subject to any disclaimer, the term of this patent is extended or adjusted under 35 U.S.C. 154(b) by 85 days.

(21) Appl. No.: 10/297,390

(22) PCT Filed: Apr. 3, 2002

(86) PCT No.: PCT/KR02/00591

§ 371 (c)(1),
(2), (4) Date: Dec. 6, 2002

(87) PCT Pub. No.: WO02/082197

PCT Pub. Date: Oct. 17, 2002

(65) Prior Publication Data

US 2003/0234825 A1 Dec. 25, 2003

(30) Foreign Application Priority Data

Apr. 6, 2001 (KR) ................................. 10-2001-0018329

(51) Int. Cl.$^7$ .............................................. G05D 23/00
(52) U.S. Cl. ....................... 702/188; 702/114; 700/282; 700/300; 703/9
(58) Field of Search ................................. 376/215–217; 715/965–967, 969, 970; 702/31, 188, 40, 50, 55, 98–100, 114, 130, 136, 138, 140, 182, 183, 187; 700/1, 9, 15, 17–20, 29–31, 83, 86, 87, 266, 267, 281, 282, 299–301; 345/961, 965, 967, 969, 970; 703/9, 12, 6

(56) References Cited

U.S. PATENT DOCUMENTS

| | | | |
|---|---|---|---|
| 5,555,179 A | 9/1996 | Koyama et al. | ............... 700/95 |
| 6,078,320 A * | 6/2000 | Dove et al. | ................. 345/866 |
| 6,141,628 A | 10/2000 | Worth et al. | ................. 702/185 |
| 6,369,841 B1 * | 4/2002 | Salomon et al. | ............ 345/854 |
| 6,510,352 B1 * | 1/2003 | Badavas et al. | ............. 700/19 |
| 6,609,070 B1 * | 8/2003 | Lueck | ......................... 702/50 |

FOREIGN PATENT DOCUMENTS

| | | |
|---|---|---|
| JP | 11-288305 | 10/1999 |
| KR | 94-4408 A | 3/1994 |
| KR | 95-24041 A | 8/1995 |
| KR | 98-75906 A | 11/1998 |

* cited by examiner

Primary Examiner—Hal Wachsman
(74) Attorney, Agent, or Firm—Birch, Stewart, Kolasch & Birch, LLP

(57) ABSTRACT

A factory automation method includes setting of all devices for a process unit to be carried out on a computer. The method includes constituting and setting various devices for a process unit on a computer display, grouping the devices into a transfer line, a heating line and a cooling line, selecting at least one from among the three grouped lines to set a control loop for a parameter such as temperature, pressure, flow rate, or pH, performing input relating to a process operation, executing a simulated operation and confirming an input error, and on-line connecting the various devices with the computer and normally operating the various devices.

16 Claims, 3 Drawing Sheets

FACTORY AUTOMATION CONTROL METHOD

This application is the national phase under 35 U.S.C. § 371 of PCT International Application No. PCT/KR02/00591 which has an International filing date of Apr. 3, 2002, which designated the United States of America, the entire contents of which are hereby incorporated by reference.

FIELD OF THE INVENTION

The present invention relates to a factory automation control system and method, and more particularly, to a factory automation system and method in which all processes in a factory are automated by using a computer.

DESCRIPTION OF THE BACKGROUND ART

Generally, in a chemical, food or fertilizer factory, it is necessary to control various processes such as supply and reaction of raw material. In order to control various devices (equipment and machinery) for a process unit, a PLC (Programmable logic controller) linking up with the various devices is used.

Since the PLC is connected with the various devices of the process unit, and a computer, a user confirms an advancing state of a process in the process unit controlled by the PLC through a computer display.

In other words, the devices carry out actions such as weighing and feeding processes of raw material, and the controls of temperature, pressure, pH, etc.

Then, in order to control operations of these devices, it is required to manually and necessarily change a program of the PLC and setting values of these devices. To this end, there occur problems in that it is not easy to set again process parameters of the devices and thus time and labor are wasted due to the resetting of the process parameters.

Further, the waste in the time and labor causes a lowering in efficiency.

SUMMARY OF THE INVENTION

The present invention has been devised to solve the above problems, and it is an object of the invention to allow constitution and setting of various devices for a process unit to be carried out on a computer display.

It is another object of the invention to group or arrange operations of various devices into a unit process and to operate and control the grouped unit processes smoothly.

It is yet another object of the invention to rearrange devices and change set values of process parameters with ease.

To accomplish the above objects and other features, there is provided a factory automation control method comprising the steps of: constituting and setting a plurality of simulation device corresponding to a plurality of real devices for a process unit on a monitor of a computer; grouping the plurality of simulation devices into a transfer line group, a heating line group and a cooling line group; selecting at least one of the three line groups to set a control loop for a parameter selected from the group consisting of temperature, pressure, flow rate, pH, level and dropping; performing an input procedure of numeric values of the parameters for a process operation of the selected line group; executing a simulation operation of the plurality of simulation devices using the input numeric values and confirming an input error in the simulation operation; and on-line connecting the plurality of real devices to the computer via a PLC and normally operating the plurality of real devices.

Preferably, the method, between the step of constituting and setting the plurality of simulation devices and the step of grouping the plurality of simulation devices, further comprises steps of: adding a level window for visually confirming the progress of the process operation; and directly controlling a numeric value corresponding to a level displayed on the level window using a numeric value control button.

Preferably, the step of adding the level window includes steps of designating a corresponding indication window in which a gauge adjustment is completed; connecting a corresponding data with a registration information of the corresponding indication window; and setting a level picture of the level window to be moved depending on a numeric value inputted on the corresponding indication window.

Preferably, the method, between the step of constituting and setting the plurality of simulation devices and the step of grouping the plurality of simulation devices, further comprises a contact point confirming step of confirming the settings of the plurality of simulation devices.

Preferably, the step of inputting and setting the plurality of simulation devices comprises the steps of: selecting the plurality of simulation devices of the process unit and positioning the selected simulation devices on the monitor of the computer; controlling a detail specification of the selected devices and completing a registration of the device on the computer display; selecting a pipe line connecting the plurality of simulation devices, positioning the selected simulation devices on the monitor of the computer, and selecting and positioning an appropriate valve among various valves at a predetermined position of the pipe line; selecting a numeric value indication window for displaying analog input/output data and digital input signals and positioning the selected numeric value indication window outside the simulation devices; designating a contact point on the digital input signals and a contact point on a digital output; and inputting a minimum value or a maximum value of the analog input data into the numeric value indication window, or carrying out a pulse input to thereby complete the gauge adjustment.

Preferably, the method, between the step of setting the control loop and the step of performing the input procedure, further includes steps of setting a digital input, designating pulse and designating a timer.

Preferably, the method, after the step of designating the timer, further comprises steps of setting a safety condition for a safe process operation and setting a condition on an overload of a motor.

Preferably, the method further comprises an operation standby function to prevent the transfer lines from being driven at the same time.

Preferably, the step of setting the control loop includes automation control for constantly maintaining an inner temperature, pressure, flow rate, pH and level of the plurality of simulation devices.

Preferably, the method further comprises a dropping function for designating the transfer line and a control indication window such that raw material is supplied into the simulation devices at a constant rate while the process condition of the simulation devices is constantly maintained.

Preferably, the method further comprises a next button selection function which allows a next process step to be continuously performed by selecting and designating a process number.

DETAILED DESCRIPTION

Hereinafter, there are described in detail preferred embodiments of the present invention with reference to the accompanying drawings.

Figure 1:
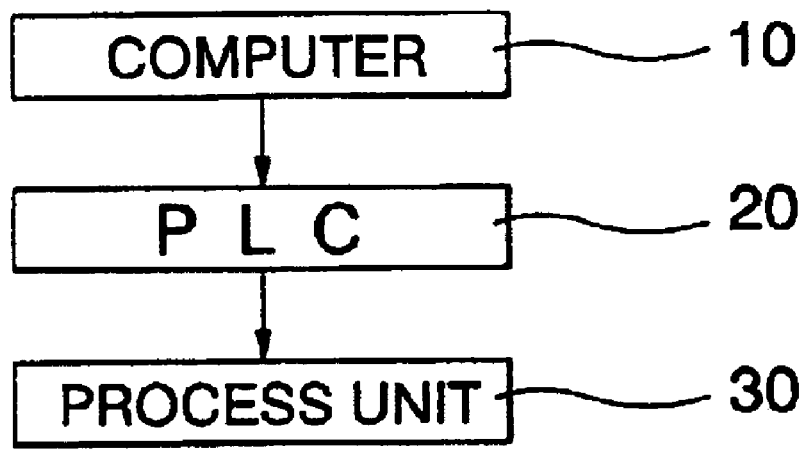
FIG. 1 is a block diagram of a factory automation control system.
Figure 2:
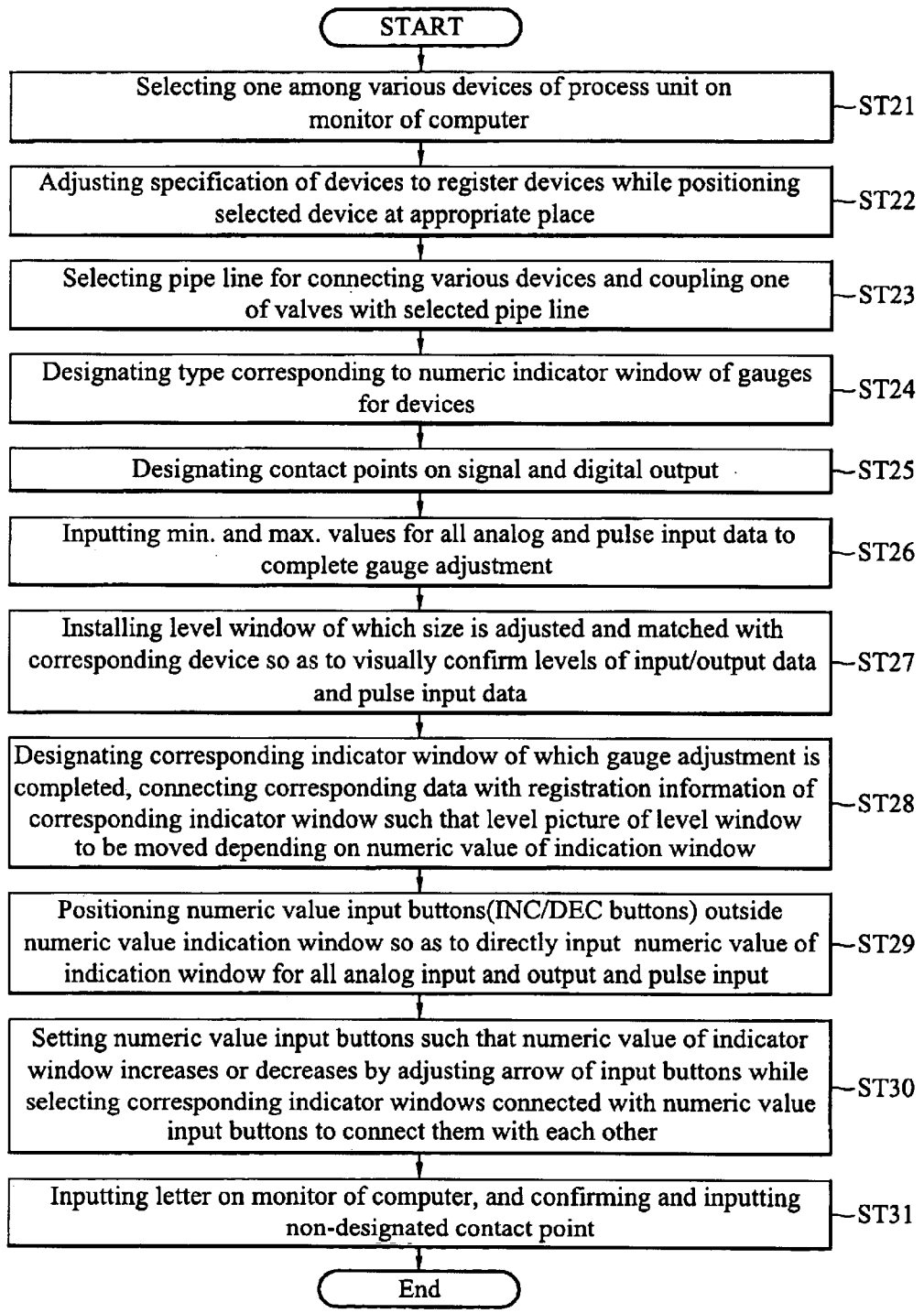
FIG. 2 is a flow diagram showing input and setting procedures of various devices of a process unit on a computer display using the system of FIG. 1 in accordance with the invention.
Figure 3:
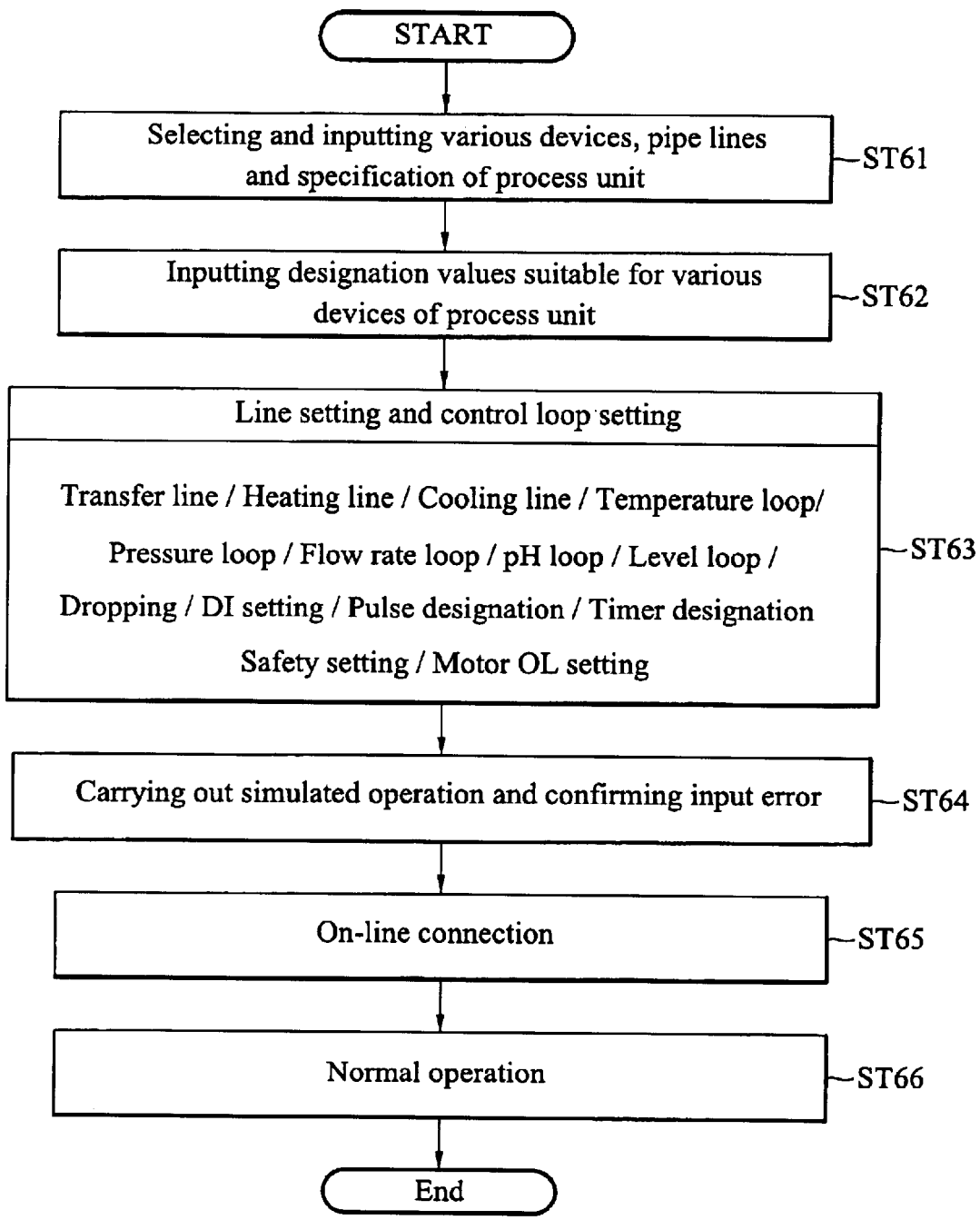
FIG. 3 is a flow diagram showing an automatic operation procedure of a process according to the process flow set in FIG. 2.

FIG. 1 is a block diagram of a factory automation control system, FIG. 2 is a flow diagram showing inventive input and setting procedures of various devices for a process unit on a computer display using the system of FIG. 1 and FIG. 3 is a flow diagram showing an automatic operation procedure of a process according to the process flow set in FIG. 2.

The present invention is applied to an automation operation control system in a chemical factory or other factories. As shown in FIG. 1, an automation operation control system of the present invention includes a process unit 30 provided with various process devices, i.e., reactor, tank, pump, motor, screw, centrifuge, heat exchanger, boiler, refrigerator, cooling tower, filter, conveyor, evaporator, crusher, mixer, dust collector, tower, switch, valve, pipe and so on, a PLC 20 linked with the various devices of the process unit, and a computer 10 provided with a program for changing the devices and a setting of a process operation.

By using the system having the constitution of FIG. 1, the various devices of the process unit are inputted and set through a monitor of the computer 10. After that, according to the set constitution, processes are automatically operated.

First, there is described a procedure for inputting and setting the various devices of the process unit on the monitor of the computer 10 with reference to FIG. 2.

Referring to FIG. 2, the various devices of the process unit are selected and the selected devices are arranged on the monitor of the computer 10. (ST21)

Afterwards, detailed specifications of the selected devices are adjusted on the monitor of the computer 10, thereby completing registration of the various devices. (ST22)

Thereafter, pipe lines for connecting the various devices with each other are selected and the selected pipe lines are arranged on the monitor of the computer 10. Then, among various valves, one valve appropriate for a selected process is selected and the selected valve is disposed at a predetermined position on the pipe line. (ST23)

Afterwards, a numeric indicator window for displaying analog input and output data and digital input signal is selected and is disposed at an edge of the monitor around the various devices. (ST24)

Next, a contact point (switch) for a digital output is designated while a contact point for the above signal is designated. (ST25) Thereafter, minimum and maximum values for all analog data and pulse input data are inputted, thereby completing gauge adjustment. (ST26)

After the completion of the gauge adjustment, it is possible to add a level window for easier confirmation of a process state. (ST27) In this case, a corresponding indicator window of which the gauge adjustment is completed is designated to connect the registration information of the corresponding level window, in which level drawing of the level window is moved depending on the numeric value of the indicator window. (ST28)

In addition, after one among the indicator windows of which the gauge adjustment is completed is connected with the numeric value input button (INC and DEC buttons), it is possible to directly adjust all analog input and output values. And the numeric value of the pulse input window can be changed through the monitor of the computer 10. (ST29 and ST30)

In order to confirm all values set until now, a step of confirming the contact point can be additively performed. (ST31) For the confirmation of the contact points, a necessary letter is inputted on the monitor of the computer 10 while non-designated contact points are confirmed using a contact point view button.

After the process constitution is completed like the above, a setting procedure for the process automation operation is carried out, and is described with reference to FIG. 3.

Referring to FIG. 3, in order to operate the various devices of the process unit in which the process constitution is completed, devices used in respective work steps, and corresponding indicator windows are previously designated depending on their characteristic, and are grouped into a transfer line group, a heating line group and a cooling line group. Among the transfer line, heating line and cooling line groups, at least one line group is set. Then, a control loop for process control parameters such as temperature, pressure, flow rate, pH and level, dropping and so on is set. Selectively, it is possible to carry out digital input (DI) setting, pulse setting, timer setting, safety setting for safe operation of a process, and overload (OL) setting of motors, only with on the monitor screen of the computer 10. (ST61 to ST63)

If the line setting and the control loop setting are completed, the input work related with the process operation is carried out. Then, a simulation operation is executed and thereby an input error is debugged. (ST64)

If the debugging work of the input error is completed, the various devices are on-line connected with the PLC and the computer, and are normally operated. (ST65 and ST66)

Hereinafter, terminologies mentioned in the present invention are defined, and the aforementioned individual procedures are specifically described.

Line and Line setting: Line is meant by an individual group having a special object and function and made by combination of pre-designating devices and corresponding indicator windows to be used in respective work steps. Line setting is meant by the step of combining designating devices and indicator windows to be included in this line. As a kind of the line, there are the transfer line, the heating line and the cooling line as mentioned above.

Control loop and Control loop setting: Loop is meant by individual groups made by previously designating one of the lines made in the line set, indicator window indicating control parameters and main valves to be used for the control. Control loop setting is meant by the step of designating kinds of lines, corresponding indicator windows and main valve constituting the loop.

It is possible to set a control loop for temperature, pressure, flow rate, pH and level, and dropping.

Thus, if the respective lines and loops are set, it is possible to carry out inputs for all process works with ease only by calling the numbers of the preset lines and loops.

As the line setting step, there are a transfer line setting for carrying out setting devices such as automatic valves, pumps and the like that should be operated when it is necessary to automatically weigh and transfer raw material, a heating line setting for carrying out setting devices used for elevating temperature of the process devices or process raw material, and a cooling line setting for carrying out setting devices used for the cooling.

As the control loop setting step, there are a temperature loop setting, a pressure loop setting, a flow rate loop setting, a pH loop setting, a level loop setting and a dropping setting. The temperature loop setting designates the corresponding heating line or cooling line for the temperature control of a device or a substance, and also designates the main valve and temperature indicator window to be used in the designated lines. The pressure loop setting designates the transfer line, main valve and pressure indicator window which should be turned on or off when it is necessary to control pressure of a device by applying vacuum or pressure. The flow rate loop setting designates transfer line, main control valve and flow rate indicator window which should be turned on or off in order to control flow rate when it is necessary to transfer vapor or liquid. The pH loop setting designates transfer line, main valve and pH indicator window which should be turned on or off in order to put acid or alkaline solution when it is necessary to control pH of liquid substance. The level loop setting designates transfer line, main valve and level indicator windows (height, volume, weight, etc.) which should be turned on or off in order to control a level of liquid substance. The dropping setting designates corresponding transfer lines and corresponding indicator windows (temperature, pressure, pH, etc.) when it is necessary to feed a chemical substance (raw material) to a device of a process unit (i.e., chemical device) while temperature, pressure, pH, etc., of a chemical device are maintained at a constant value.

In addition to the aforementioned settings, there are a digital input setting, a pulse setting, a timer setting, and a safety setting. The digital input setting designates a relationship between the digital input (DI) signal and the digital output signal (DO). The pulse setting designates a switch to be instantaneously turned on and then turned off when the switch receives ON command. The timer setting designates a timer such that a switch is alternately and repeatedly turned on or off at a constant interval when the switch receive ON command. The safety setting designates switches that should be turned on at the same time or that should not be turned on at the same time, or designates switches that should be turned on or off when an analog input numeric value reaches a maximum.

Next, there are concretely described respective lines and loops in the line setting step and the control loop setting step.

In order to automatically weigh and transfer chemical material in chemical processes, the transfer line designates devices including pump, automatic valve, etc., and indicator window (select one of indicator windows of weight, flow rate, volume, digital input, etc.) sequentially and is grouped as one transfer line. The line is called and designated during a process input step. As a consequence, during the execution of a real process, the switches designated in the line are turned on or off in the order designated, and reads and determines a variation in numeric value in the indicator window designated by the computer by itself. Then, if the amount designated during the process input step is transferred, the designated switches are turned on or off, thereby completing the works of the transfer line.

Next, the procedure of the transfer line designation is as follows:

1. In the step 1, switches which should be turned on or off in order to transfer chemical substances are designated according to a fixed order;

2. In the step 2, an indicator window for measuring a transfer amount is designated; and 3. In the step 3, switches which should be turned on or off for the completion of the transfer are designated according to a fixed order.

The above designations are carried out by clicking mouse on a computer or pressing keyboard.

Like the above, the transfer lines have several kinds of operation characteristics depending on the designation types.

First, during the procedure of the transfer line designation, in case that after the designation of the switches (step 1), only the indicator windows are designated (step 2) and the item of step 3 is omitted, after the transfer of the designated amount is completed in actual plant operations, all of the switches which were designated to be turned on at step 1 are all turned off.

Second, in case that the three setting steps are all designated, after the transfer of the designated amount is completed, only the switches which were designated to be turned on/off at step 3 are turned on/off.

Also, in case that only the switches are designated, i.e., in case that only the step 1 is designated, if this line is called in a process, the designated switches perform only ON or OFF, and no weighing is performed.

Further, in case that a transfer line designated to the step 2 or step 3 is called for only simple ON/OFF action, the computer determines such action by itself, and performs the only ON/OFF action for the switches designated in the step 1.

When two independent processes are operated and there is a device in a transfer line which is designated to operate at the same time in the two independent processes, a subsequent one of the two independent processes has the operation standby function waiting for a first started process to be ended, the operation standby function being contained in the transfer line. In other words, if the transfer line is called, switches which should be turned on or off are checked out before the transfer line is operated. If one of these switches is in on-state, this system has a function in which it waits until the on-state switch is turned off, and allows for the transfer line to be operated if the on-state switch is changed to the turn-on state, thereby preventing a collision between the transfer lines.

By using the operation standby function, in two completely independent transfer lines which should not be operated at the same time, an imaginary switch can be made on the screen of the computer. By designating the imaginary switch in On-state, it can be prevented that the two completely independent transfer lines are operated at the same time.

The heating line is used for heating a device or a substance. For this purpose, switches which should be turned on or off are designated according to a fixed order. Also, a temperature indicator window for displaying the temperature upon heating is designated. The switches and the temperature indicator window are grouped by one line. After the grouped one line is designated in a temperature loop, if the loop is called in a process, this heating line is operated.

The cooling line is used for cooling a device or a substance. For this purpose, switches which should be turned on or off are designated according to a fixed order.

Also, a temperature indicator window for displaying the temperature upon cooling is designated. The switches and the temperature indicator window are grouped by one line. After the grouped one line is designated in a temperature loop, if the loop is called in a process, this cooling line is operated.

The temperature loop is operated when the temperature loop is called in a process, after the switches and the indicator windows that were designated in the heating line and the cooling line are designated in a temperature loop. The temperature loop is designated in the order in which first a corresponding temperature indicator window is designated, second the heating line or the heating line is selected, and last a main valve to be used in the temperature control is selected.

Operation of the temperature loop is characterized in that if ON/OFF valve is designated as the main valve, a control output is ON/OFF, i.e., a digital signal is sent as control output, or if the control valve is designated as the main valve, 4–20 mA, i.e., an analog signal is sent as control output.

The pressure loop is operated for vacuum or pressure is applied to a device when the loop is called in a process after a transfer line and a corresponding pressure indicator window are designated as a single pressure loop.

The pressure loop is designated in the order in which first a corresponding pressure indicator window is designated, second a corresponding transfer line is designated, and last a main valve to control pressure is selected.

Operation of the pressure loop is characterized in that if ON/OFF valve is designated as the main valve, a control output is ON/OFF, i.e., a digital signal is sent as control output, or if the control valve is designated as the main valve, 4–20 mA, i.e., an analog signal is sent as control output. At this time, in the case that the indicator window of weight, volume and so on is designated in the designated transfer line, only the switches designated at step 1 of the procedure of the transfer line designation are turned on or off.

Further, when a corresponding pressure indicator window is designated, if an indicator window having a unit of torr is selected the pressure loop is carried out in a vacuum process, or if an indicator window having a unit of kg-f is selected, the pressure loop is carried out in a pressure application process.

The flow rate loop is operated when the flow rate loop is called, after a transfer line and a corresponding flow rate indicator window are designated as the flow rate loop.

The flow rate loop is designated in an order in which a corresponding transfer line is designated, and a main control valve for controlling flow rate is selected.

Operation of the flow rate loop is characterized in that when indicator window of weight, volume and so on is designated in the designated transfer line, only the switches designated at step 1 of the procedure of the transfer line designation are turned on or off.

The pH loop is operated in order to feed acid or alkaline solution and to control pH of a liquid substance when the pH loop is called in a process, after a transfer line in which devices which should be turned on or off, and a corresponding pH indicator window are designated as the pH loop.

The pH loop is designated in an order in which a corresponding pH indicator window is designated, a corresponding transfer line is designated, and a main valve to control pH is selected.

Operation of the pH loop is characterized in that in case that indicator window of weight, volume and so on is designated in the designated transfer line, only the switches designated at step 1 of the procedure of the transfer line designation are turned on or off.

Further, if the control valve is selected as the main valve, the control valve is operated in two types of operations, i.e., 0% and 100%.

The level loop is operated when the level loop is called, after a transfer line and a corresponding level indicator window (height, volume and weight) are designated as the level loop.

The level loop is designated in an order in which a corresponding level indicator window is designated, a corresponding transfer line is designated and a main valve for controlling the level is selected.

Operation of the level loop is characterized in that if the ON/OFF valve is designated as the main valve, a control output is ON/OFF, i.e., a digital signal is sent, or if the control valve is designated as the main valve, 4–20 mA, i.e., an analog signal is sent as control output.

At this time, in case that indicator windows of weight, volume and so on are designated in the designated transfer line, only the switches designated at the step 1 of the procedure of the transfer line designation are turned on or off.

The dropping line is used for feeding chemical substances at a constant rate when the chemical substance is fed into various devices of a process unit while maintaining temperature, pressure, pH and so on within the devices at a constant level, and is operated when the dropping line is called after a corresponding transfer line and a corresponding control indicator window (temperature, pressure, pH, etc.) are designated as the dropping line.

The dropping line is designated in an order in which a corresponding level indicator window is designated, a corresponding transfer line is designated and a main valve for controlling the level is selected.

Operation of the dropping line is characterized in that since control values inputted in the process input step are a priority condition on operating the dropping line, if the control values are not satisfied, the operation of the dropping line is stopped.

Further, the transfer line repeatedly operates or stops with minimum time interval as inputted, thereby feeding chemical substance (raw material).

The DI setting is used for defining a relationship between digital input signal inputted from a field, i.e., a process unit, and digital output signal.

The pulse setting is set such that when a switch receives ON command, the switch is instantaneously turned on and then turned off.

The timer setting is set such that when a switch receives On command, the switch repeats ON and OFF with constant intervals.

The safety setting (safety loop) is to set switches which should be turned on at the same time, switches which should not be turned on at the same time, or switches which should be turned on or off when an analog input value is set to a maximum.

The motor overload setting designates a digital input terminal for receiving an overload when a motor is overloaded. receiving an overload when a motor is overloaded.

After the line setting, the control loop setting and so on are completed according to the methods described above, a process is registered in a process button, and a process input procedure on the registered process is carried out.

By clicking the "process input" button and pushing button among the registered process buttons, the process input is prepared.

As the process input, there are process button designation, selection of process kind (independent process or sequential process), weighing of raw material, supply of raw material, start and stop of dropping, transfer of product, start and stop of vacuum line, start and stop of compression line, start and stop of other transfer lines, start and stop of heating process, start and stop of cooling process, maintaining temperature, start and stop of level control, start and stop of pH control, start and stop of individual devices, input of standby time, standby of digital input, standby of analog input, designation of next button, etc.

Here, the process button designation in the process input procedure includes the designation of a button among process buttons (user buttons). By selecting the process input button and one of the process buttons (user buttons), the process input is prepared.

When the independent process is selected, all processes to be inputted later start independently at the same time and end independently. When all processes are completed, it is regarded that once work for a corresponding process button is completed.

When the sequential process is selected, all processes to be inputted later are sequentially performed according to an input sequence. If the last process is completed, it is regarded that once work for a corresponding process button is completed.

The weighing and supply of raw material are carried out by designating a corresponding transfer line and inputting the value of a transfer amount. At this time, in case that the indicator window designated in the transfer line is a digital input window, 0 is inputted.

In the start and stop of the dropping, the dropping work is carried out by inputting the number of a drop line designated in the step of the line and control loop set, a total amount to be fed (in case that weighing is not carried out, 0 is inputted), a total time to be fed, a time interval on being fed, and then inputting control value (one of temperature, pressure, pH and so on).

If the total amount to be fed is not designated, the dropping stop has to be designated so as to end the dropping work.

The product transfer is used so as to transfer products or intermediate products, and is carried out by inputting a transfer line number, and turning on or off only switches which were designated prior to designating indicator windows in case that an analog input indicator window is designated at the input procedure of the transfer line.

In the start and stop of the vacuum and compression lines, the operations of the vacuum and compression within the various devices are carried out by inputting a predesignated pressure loop number and a control pressure.

The start and stop of the other transfer lines are carried out by inputting start or stop of a line designated as the transfer line, and if an analog input indicator window is designated at the inputted transfer line, only switches which were designated prior to designating indicator windows are turned on or off.

In the start and stop of the heating and cooling processes, the start is carried out by sequentially inputting a predesignated temperature loop and a control temperature, and the stop is carried out by designating the stop during the control.

In the maintaining temperature, after it arrives at a control temperature in the heating or cooling process, if a maintenance time is inputted, the control temperature is maintained at the inputted maintaining time.

In the start and stop of the level control, the start is carried out by designating an operation of a predesignated level loop and inputting numeric value of a control level, and the stop of the level control is carried out by designating the stop of the level control.

In the start and stop of the pH control, the start is carried out by inputting number of a predesignated pH loop, inputting kind of liquid to be fed to control the pH, i.e., acidity or alkalinity, inputting a minimum amount allowed to be fed at once for the control of pH, inputting a time to be stirred after feeding the minimum amount in order to read the pH value and inputting a pH value for the control.

The stop of the pH control is carried out by selecting stop of the pH control and inputting a number of the pH loop.

The operation and stop of the individual devices are used to independently operate a device which the contact point is designated, and are carried out by inputting numbers of the contact points of the devices, and ON and OFF.

The input of the standby time is used to input the standby time after a previously inputted process is ended, before a next process is performed. Thus, if the standby time is inputted, the next process is on standby during the standby time.

The DI standby input is carried out by inputting a terminal number of a digital input signal, and is mainly used in the sequential process. If the DI standby input process is called, the next process is carried out when the digital input signal of the inputted terminal number is changed from OFF to ON, or from ON to OFF.

The AI standby input is completed by inputting a terminal number of an analog input signal, inputting whether the analog signal is a rising one or a falling one, and inputting an analog numeric value.

When the operation reaches to the step of AI standby input process and the inputted analog signal arrives at the inputted analog numeric value, the computer proceeds the present process to a next one.

Conventionally, by inputting standby time or setting a digital signal or an analog signal, the process work is proceeded from one process to a next process. However, the present invention makes it possible to insert a set of processes designated within a button into a set of present processes with ease only by designating the number of a process button using the next button designation function.

During the input of the process, by designating the number of a process button to be connected next using the next button function, all processes inputted within the process button are carried out. By selecting "wait the end of this process (1)", after all processes within this button are completely carried out, the present process is proceeded to a designated next process, whereas by selecting "No (0)", a process within this button starts simply, and then the process goes to a next process.

Like the above, if the input of the process is completed, a simulated operation is carried out while an error in the inputted process is confirmed. In other words, the computer carries out a simulated operation in an off-line state to the plant if a simulated operation button and a corresponding process button are pushed. Through the simulated operation, an error in the process input is found and corrected. If the error correction is completed, an on-line button is pushed to carry out the automated operation of the factory without an operator.

Although the present invention has been illustrated with reference to embodiments of the present invention, it should be understood that the scope of the present invention is not limited to the illustrated embodiments but various changes, substitutions and alterations could be made hereto without departing from the spirit and scope of the invention as defined by the appended claims.

INDUSTRIAL APPLICABILITY

As described above, according to the present invention, various devices of a process unit are constituted and set on the computer, and they operate in a grouped unit process, so that the process control and operation are automatically and smoothly carried out.

Further, it is easy to change the constitution and setting of the various devices.

Furthermore, since reconstitution and resetting for the various devices are performed with ease on the computer, work time and labor are saved and work efficiency is enhanced.

What is claimed is:

1. A factory automation control method comprising the steps of:
   constituting and setting a plurality of simulation device corresponding to a plurality of real devices for a process unit on a monitor of a computer;
   grouping the plurality of simulation devices into a transfer line group including a plurality of transfer lines, a heating line group and a cooling line group; selecting at least one of the three lines groups and setting control loops for parameters selected from the group consisting of temperature, pressure, flow rate, pH, level and dropping;
   performing an input procedure of numeric values of the parameters for a process operation of the selected line group;
   executing a simulation operation of the plurality of simulation devices using the inputted numeric values and confirming whether there exists an input error in the simulation operation; and
   when it is confirmed that no input error exists, on-line connecting the plurality of real devices with the computer and normally operating the plurality of real devices.

2. The method of claim 1, between the step of constituting and setting the plurality of simulation devices and the step of grouping the plurality of simulation devices, further comprising steps of:
   adding a level window for visually confirming a progress of the process operation; and
   directly controlling a numeric value corresponding to a level displayed on the level window using a numeric value control button.

3. The method of claim 2, wherein the step of adding the level window comprises:
   designating a corresponding indication window in which a gauge adjustment is completed;
   connecting a corresponding data with a registration information of the corresponding indication window; and
   setting a level picture of the level window to be added depending on a numeric value inputted on the corresponding indication window.

4. The method of claim 2, wherein the step of directly controlling the numeric value comprises the steps of:
   connecting a numeric value input button including INC and DEC buttons with any one of a plurality of indication windows including all analog input/output and pulse input numeric value indication windows in which a gauge adjustment is completed; and
   directly adjusting numeric values of any one of the plurality of indication windows connected with the numeric value input button by adjusting up and down arrow buttons of the numeric value input buttons on the monitor of the computer.

5. The method of claim 2, between the step of constituting and setting the plurality of simulation devices and the step of grouping the plurality of simulation devices, further comprising a contact point confirming step of confirming the setting of the plurality of simulation devices.

6. The method of claim 1, between the step of constituting and setting the plurality of simulation devices and the step of grouping the plurality of simulation devices, further comprising a contact point confirming step of confirming the setting of the plurality of simulation devices.

7. The method of claim 1, wherein the step of constituting and setting the plurality of simulation devices comprises the steps of:
   selecting the plurality of simulation devices of the process unit and positioning the selected plurality of simulation devices on the monitor of the computer;
   controlling a detail specification of the selected plurality of simulation devices and completing a registration of the plurality of simulation devices on the monitor of the computer;
   selecting a pipe line connecting the plurality of simulation devices, positioning the selected plurality of simulation devices on the monitor of the computer, and selecting and positioning an appropriate valve among various valves at a predetermined position of the pipe line;
   selecting a numeric value indication window for displaying analog input/output data and digital input signals and positioning the selected numeric value indication window around the plurality of simulation devices;
   designating a contact point on the digital input signals and a contact point on a digital output corresponding to the digital input signals; and
   inputting a minimum value or a maximum value of the analog input data to complete a gauge adjustment.

8. The method of claim 7, between the step of setting the control loops and the step of performing the input procedure, further comprising steps of setting a digital input, setting a pulse and setting a timer.

9. The method of claim 7, further comprising an operation standby function to prevent the plurality of transfer lines from being driven at the same time.

10. The method of claim 7, wherein the step of setting the control loops comprises automation control for constantly maintaining at least one of an inner temperature, pressure, flow rate, pH or level of the plurality of simulation devices.

11. The method of claim 1, between the step of setting the control loops and the step of performing the input procedure, further comprising steps of setting a digital input of the numeric values, setting a pulse and setting a timer.

12. The method of claim 11, after the step of setting the timer, further comprising steps of setting a safety condition for a safe process operation and setting a condition on an overload of a motor.

13. The method of claim 1, further comprising an operation standby function to prevent the plurality of transfer lines from being driven at the same time.

14. The method of claim 1, wherein the step of setting the control loops comprises automation control for constantly maintaining at least one of an inner temperature, pressure, flow rate, pH or level of the plurality of simulation devices.

15. The method of claim 1, further comprising a dropping function for designating the plurality of transfer lines and a control indication window such that raw material is supplied into the plurality of simulation devices at a constant rate while the process operation of the plurality of simulation devices is constantly maintained.

16. The method of claim 1, further comprising a next button designation function which allows a next process step to be performed by selecting and designating a process number.

* * * * *